United States Patent
Liu et al.

(10) Patent No.: US 7,656,611 B2
(45) Date of Patent: Feb. 2, 2010

(54) LAMINATED HIGH MOMENT MAGNETIC FILMS ANTIFERROMAGNETIC COUPLING AS WRITE POLE OF PERPENDICULAR MAGNETIC RECORDING HEAD

(75) Inventors: Yinshi Liu, Foster City, CA (US);
Nian-Xiang Sun, Sunnyvale, CA (US);
Yunxiao Gao, Sunnyvale, CA (US);
Yimin Hsu, Sunnyvale, CA (US);
Tomohiro Okada, Odawara (JP);
Yasuyuki Okada, Odawara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 364 days.

(21) Appl. No.: 10/927,875

(22) Filed: Aug. 27, 2004

(65) Prior Publication Data
US 2006/0044680 A1    Mar. 2, 2006

(51) Int. Cl.
*G11B 5/147*    (2006.01)
*G11B 5/31*    (2006.01)
(52) U.S. Cl. ............................................. 360/125.12
(58) Field of Classification Search ............. 360/126, 360/125.63, 125.58, 125.08, 125.12, 125.04, 360/125.03
See application file for complete search history.

(56) References Cited

U.S. PATENT DOCUMENTS

| | | | |
|---|---|---|---|
| 4,814,921 A * | 3/1989 | Hamakawa et al. | 360/126 |
| 5,132,859 A * | 7/1992 | Andricacos et al. | 360/125.63 |
| 6,259,583 B1 * | 7/2001 | Fontana et al. | 360/125.63 |
| 6,524,491 B1 | 2/2003 | Liu et al. | |
| 6,778,358 B1 * | 8/2004 | Jiang et al. | 360/125.5 |
| 7,280,314 B2 * | 10/2007 | Gill et al. | 360/125.12 |
| 7,382,574 B2 * | 6/2008 | Li et al. | 360/125.08 |
| 2002/0027750 A1 | 3/2002 | Shukh | |
| 2003/0002212 A1 | 1/2003 | Chen et al. | |
| 2004/0004786 A1 * | 1/2004 | Shukh et al. | 360/126 |
| 2004/0120074 A1 * | 6/2004 | Okada et al. | 360/125.12 |
| 2004/0150912 A1 * | 8/2004 | Kawato et al. | 360/126 |
| 2005/0013044 A1 * | 1/2005 | Hirata et al. | 360/125.12 |

* cited by examiner

*Primary Examiner*—Craig A. Renner
(74) *Attorney, Agent, or Firm*—Maryam Imam; IPxLaw Group LLP

(57) ABSTRACT

A perpendicular write head includes a main pole comprising high moment magnetic layers laminated with both soft magnetic layers and non-magnetic layers for antiferromagnetic coupling (AFC) between the high moment material layers. The perpendicular write head includes a return pole connected to the main pole by a back gap closure at a distal end and separated from the main pole by a gap at an air bearing surface (ABS). A write coil is positioned between the main pole and the return pole and the surface area of the return pole at the ABS is substantially larger than the surface area of the main pole at the ABS.

23 Claims, 9 Drawing Sheets

LAMINATED HIGH MOMENT MAGNETIC FILMS ANTIFERROMAGNETIC COUPLING AS WRITE POLE OF PERPENDICULAR MAGNETIC RECORDING HEAD

BACKGROUND OF THE INVENTION

1. Field of the Invention

This invention relates generally to the field of perpendicular magnetic recording heads and more particularly, to recordings heads having antiferromagnetic coupling (AFC) to achieve both low remnant magnetization and low field required to reach the maximum magnetization allowing higher density recording with accuracy.

2. Description of the Prior Art

As the recording density of magnetic hard drives (or disc drives) increases, a physical limitation is experienced using longitudinal recording systems partly due to thermal relaxation known as super-paramagnetism. That is, the density requirements for meeting today's storage needs are simply not attainable with longitudinal recording systems. To provide further insight into this problem, it is anticipated that longitudinal recording systems will lose popularity as storage capacities in excess of about 150 Gigabytes-per-square-inches become a requirement. These and other factors have lead to the development and expected launch of perpendicular recording heads or write heads. Perpendicular recording is promising in pushing the recording density beyond the limit of longitudinal recording.

Accordingly, perpendicular recording potentially can support much higher linear density than longitudinal recording due to lower demagnetizing fields in recorded bits, which diminish when linear density increases.

A magnetic recording head for perpendicular writing generally includes two portions, a write head portion or head for writing or programming magnetically-encoded information on a magnetic media or disc and a reader portion for reading or retrieving the stored information from the media.

The write head or recording head of the magnetic head or disc drive for perpendicular recording typically includes a main pole and a return pole which are magnetically separated from each other at an air bearing surface (ABS) of the writer by a nonmagnetic gap layer, and which are magnetically connected to each other at a region distal from the ABS at a back gap closure (yoke). This structure is a single-pole writes head because while a main pole and return pole are referred thereto, the return pole is not physically a pole, rather, it serves to close the loop with the main pole and the soft under layer for magnetic flux circuit.

Positioned at least partially between the main and return poles are one or more layers of conductive coils encapsulated by insulation layers. The ABS is the surface of the magnetic head immediately adjacent to the perpendicular medium.

To write data to the magnetic medium, an electrical current is caused to flow through the conductive coil, thereby inducing a magnetic field across the gap between the main and return poles. By reversing the polarity of the current through the coil, the polarity of the data written to the magnetic media is also reversed.

The main and return poles are generally made of a soft magnetic material. Both of them generate magnetic field in the media during recording when the write current is applied to the coil. A magnetic moment of the main pole should be oriented along an easy axis parallel to the ABS when the main pole is in a quiescent state, namely without a write current field from the write coil. When the magnetic moment does not return to an orientation parallel to the ABS after being subjected to multiple instances of the write current field, the main pole is not stable. Therefore, in an unstable pole, the orientation of the magnetic moment might remain nonparallel to the ABS position even after current to the write coil is turned off. This is referred to as remnant moment. Accordingly, the remnant magnetic field of the main pole may deteriorate or even erase data from the disc. Further, an unstable pole results in increased switching time when current is applied. In a perpendicular head for high track density recording, the main pole is a predominant source of instability due to a strong demagnetizing field across the pole width at the ABS and the necessity of using magnetic material with high magnetic moment saturation.

Thus, the need arises for improvements to the structure of the main pole of a perpendicular recorder or write head that effectuates low remnant magnetization while requiring a low field to achieve saturation magnetization.

In the perpendicular recording heads, writing and erasing of information is performed by a single-pole write head. That is, the return pole is, in essence, a misnomer because it does not actually serve as a pole. The single-pole or the main pole is composed of high moment magnetic materials, the most common example being cobalt-iron (CoFe) alloys. One of the problems with the single-pole write head is erase-after-write or undesirable erasure of information. To avoid this problem, the high moment materials for the single-pole generally have should have very small remnant moment. Remnant moment is moment that exists in the absence of magnetic field. Remnant moment can be reduced by laminating the high moment magnetic material (for example CoFe or cobalt-iron alloy) into multilayers.

The most recent lamination scheme utilizes antiferromagnetic coupling (AFC) between neighboring CoFe (cobalt-iron alloy) laminated layers. The basic film structure is CoFe/AFC/CoFe where the two CoFe layers are laminated within a thin AFC layer (such as chromium). Due to the antiferromagnetic coupling between the two CoFe layers, the magnetic moments in the CoFe layers are in the opposite direction relative to each other so that they cancel each other at zero field, thus, realizing a very small remnant magnetization. This is the most effective way to eliminate erase-after-write.

However, the drawback with the foregoing approach is significantly increased saturation field (or decreased permeability), which increases rise time of the write field requiring higher coil current and thus greater power consumption with lower write accuracy. Saturation field is defined here as an external field required achieving approximately 95% saturation magnetization (an example of graph including saturation field responses, measured in Oersteds, is provided in FIG. 9). This is clearly undesirable for high data rate recording because, among other reasons, more heat is generated causing pole protrusion, which is likely to cause hard drive or disc drive failures.

Some of the issues associated with prior art methods and techniques vis-à-vis the design or manufacturing of the main pole is now discussed with reference to various figures.

In FIG. 1, an angled side view of a portion 10 of a perpendicular recording head is shown to include a main pole 12, a coil(s) 14 and a return pole 16. The main pole 12 and the return pole 16 form a U-shape around the coil 14. In operation, current flows through the coil 14 creating a magnetic field between the main pole 12 and the return pole 14. When programming or storing information onto a medium, magnetically-encoded information is written by creating a magnetic path from the main pole 12 to the medium and back to the return pole 16 to close the loop.

Generally, the narrower the main pole 12, the more bits can be written per unit area on to a medium. However, use of a narrow main pole has been known to introduce large remnant field, which causes undesired erasure of valid data stored in the medium.

FIG. 2 shows an example of a narrow main pole at 18. The reason for the large remnant field is, in large part, the presence of only a single domain at 20. Domains are magnetic orientations. In FIG. 3 however, due to the presence of a closed domain structure as a result of a wide main pole, shown at 21, the remnant field is small. That is, multiple domains, shown at 22-40, cancel each other thus leaving a small remnant field effect. It should be noted that the orientations or domains shown in FIGS. 2 and 3 are present in the absence of any writing or current being applied to the coil 14. In high density recorders, such as perpendicular recorders or heads, a narrow main pole 12 is preferable, such as that shown in FIG. 2, however, as earlier stated, the problem then becomes undesirable erasure due to the presence of large remnant field. Remnant field is generally the effects of previous magnetization. Thus, when programming or writing is performed and the head is shut off or not being employed for storage, the effects of remnant field or a residual field preside.

FIG. 4 shows a graph of the effects of a narrow main pole width on remnant field. The horizontal axis shows a measure of the main or write pole's width in nano meters microns (nm) and the vertical axis shows a measurement of the remnant field in Oersteds (Qe). As shown at 50, a main pole width of 150 nm results in remnant field of 1000 Oe while, as shown at 52, a main pole width of about 60 nm results in remnant field of 3000 Oe. Accordingly, as the width of the main pole is narrowed, which is desirable in high density recorders, the remnant field effects increase. The graph of FIG. 4 is measurements for a disc drive that has a track width of 60 to 200 nm, a write head that has a throat height of 200 nm, a main pole that has a Bs of 2.0 Tesla, a head-to-medium measurement of 15 nm, a medium thickness of 20 nm and a separation layer of 5 nm.

FIG. 5 shows, in graphical form, the undesirable effects of the residual effect and thus, instability of the main pole or write performance. The graph in FIG. 5 shows a horizontal axis that represents the number of read or write tests and the vertical axis represents a normalized output. The graph results from a test performed on the recording head where data or information is first written, such as 5 or 6 bits, and next, writing is stopped so that no current is flowing through the coil of the write head and the head is allowed to fly on top of the medium or disc (with no driving current). If no remnant field existed, the graph would show a bar across the horizontal line at 54 with a normalized output of 1.0 for the entire read and/or write tests. Instead, undesirable erasures result due to the presence of remnant field, as shown, for example, at 56-64.

FIG. 6 shows yet another graph of the effects of write instability as a function of the main pole width. The horizontal axis of the graph of FIG. 6 represents the magnetic write width in nm, which is proportional to the width of the main pole or write width and the vertical axis of the graph of FIG. 6 represents the change in output in percentage. The change in output is the change in the stored data or information and is calculated by the maximum value of an encoded value minus the minimum value thereof divided by the maximum value. For example, as the width is narrowed or becomes close to 150 nm, the percentage of change becomes approximately 80% or a near-complete loss of data. An output variation of 20% is generally regarded as undesirable or unacceptable because the error rate increases drastically.

FIGS. 7 and 8 show existing designs of main poles. FIG. 7 shows the main pole with only one material or lamination, namely, a CoFe alloy and a pole width of 60 nm and a throat height of 60 nm. The pole width is shown at 600 and the throat height is shown 620. As shown, the moments or domains 640, 66, 68 and 70 are scattered, pointing at different directions while no writing operation is in process. This, in effect, causes a high remnant field, in this case 1700 Ge while the main pole 12 of FIG. 8 has as its characteristic, a remnant field of only 200 Ge. The latter is due to the structure of the main pole 12 having three adjacent laminations, resulting in a multilayered pole. In the example of FIG. 8, three laminations or layers are employed, a non-magnetic layer 72, which serves as an underlayer to a magnetic layer 74, which, in turn, serves as an underlayer to another magnetic layer 76. The proximity of the magnetic and non-magnetic layers have the effect of canceling the moments when no current flows or no write operation is being performed because each of the layers have an opposite moment thereby canceling adjacent moments. For example, the moment 78 is opposite to that of the moment 80 and the latter is adjacent to the moment 82. Thus, the orientations of the moments of FIG. 8 are each in a particular direction or opposite to each other, whereas, the orientations of the moments of FIG. 7 are undefined or scattered. The net effect of the foregoing structure is AFC of adjacent laminations or layers and a substantial reduction in remnant field. Multilayering of the magnetic and non-magnetic layers of the pole 12 of FIG. 8 causes coupling, in opposite direction, of these layers resulting in AFC. The remnant field of the main pole 12 of FIG. 8 is 200 Ge. An example of a magnetic layer is one that is a CoFe alloy and an example of a nonmagnetic layer is one that is chromium (Cr).

FIG. 9 shows a graph of the driving (or external) magnetic field (measure in Oersteds (Oe)) vs. normalized moment for the two types of films of FIGS. 7 and 8, i.e. one film being made of a single layer, such as CoFe, and another film being made of multilayers and having AFC affects. The curves at 84 represent an eight-layer film, such as that of FIG. 8 and the curves at 86 represent a single layer film, such as that of FIG. 7. The graph of FIG. 9 is commonly referred to as a BH loop and in essence, it represents the change of magnetic moment in the material in responding to the external magnetic field. In the case of the main pole, the external field is generated by electrical current in a coil. The moment at zero field corresponds to remnant moment when the write head is not writing on the media. When writing or erasing, it is desired that pole material reaches the saturated moment for best writability. The less current needed to reach saturation, the more desirable because increased current causing increased heat in the head resulting in increased mechanical failures and lower recording or writing speeds.

As shown at 84, the multilayered pole design results in additional current or a slower recording time than the single layered pole shown at 86. Higher current also may result in pole protrusion thereby damaging magnetic properties and reducing read/write performance and increasing mechanical failure. To rephrase, requirements for higher field to reach maximum magnetization cause higher coil current to saturate the pole for providing sufficient overwrite, thus, more heat is generated causing pole protrusion. Furthermore, lower write speeds are realized that may not be suitable for high data rate drives.

Therefore, the need arises for a main pole employed in perpendicular recorders or disc drives having characteristics of low remnant magnetization and low saturation field.

SUMMARY OF THE INVENTION

Briefly, a perpendicular write head is disclosed to include a main pole comprising high moment magnetic layers laminated with both soft magnetic layers and non-magnetic layers for antiferromagnetic coupling (AFC) between the high moment material layers.

In another embodiment of the present invention, a perpendicular write head main pole includes a lamination of at least two magnetic layers separated by a non-magnetic layer for providing antiferromagnetic coupling (AFC) between the magnetic layers. Each of the two magnetic layers further comprises of at least a first and second magnetic layer separated by a third magnetic layer different from the first and second magnetic layers. The third magnetic layer provides for a thicker combined first and second magnetic layer, with lower saturation magnetization and higher AFC coupling than a single magnetic layer of equal thickness.

IN THE DRAWINGS

FIG. 1 shows an angled side view of a portion 10 of a prior art perpendicular recording or head is shown to include a main pole 12, a coil(s) 14 and a return pole 16.

DETAILED DESCRIPTION OF THE PREFERRED EMBODIMENT

Figure 10:
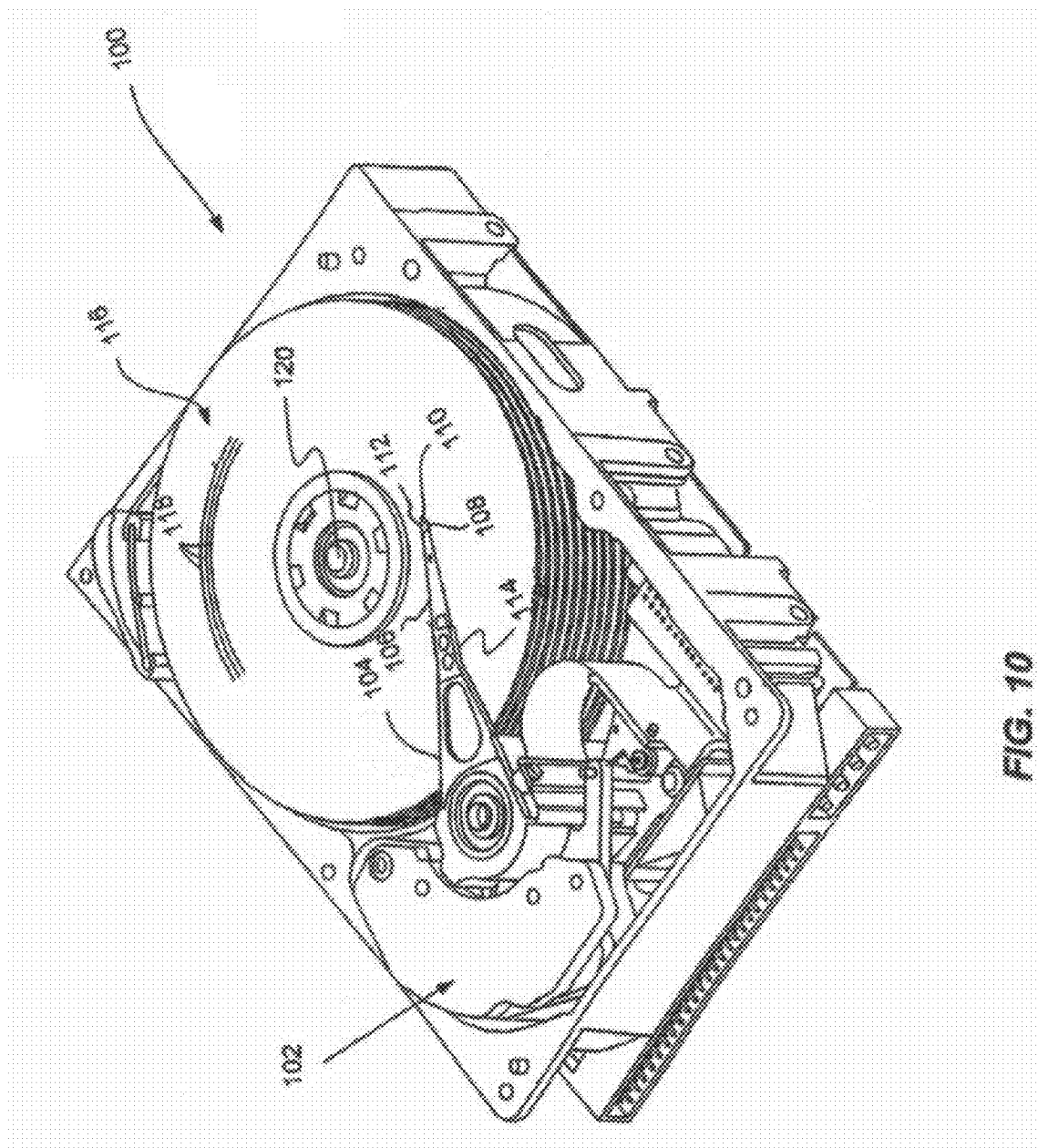
FIG. 10 shows a top perspective view of a disc drive 100 is shown in accordance with an embodiment of the present invention.

Referring now to FIG. 10, a top perspective view of a disc drive 100 is shown in accordance with an embodiment of the present invention. The disc 100 is shown to include a voice coil motor (VCM) 102, an actuator arm 104, a suspension 106, a flexure 108, a slider 110, a read-write (perpendicular) head 112, a head mounting block 114, and disc or media 116. Suspension 106 is connected to the actuator arm 104 at the head mounting block 114. The actuator arm 104 is coupled to the VCM 102. The disc 116 includes a plurality of tracks 118 and rotates about axis 120. The tracks 118 are circular, each extending circularly around the surface of the disc 116 for storing magnetically-encoded data or information using the perpendicular head 112, which will be discussed in greater detail with respect to further figures.

During operation of the disc drive 100, rotation of the disc 116 generates air movement which is encountered by the slider 110. This air movement acts to keep the slider 110 afloat a small distance above the surface of the disc 116, allowing the slider 110 to fly above the surface of the disc 116. The VCM 102 is selectively operated to move the actuator arm 104 around the axis 120, thereby moving the suspension 106 and positioning the transducing head (not shown), which includes a main pole (not shown), by the slider 110 over the tracks 118 of the disc 116. It is imperative to position the transducing head properly to read and write data from and to the concentric tracks 118.

Figure 1:
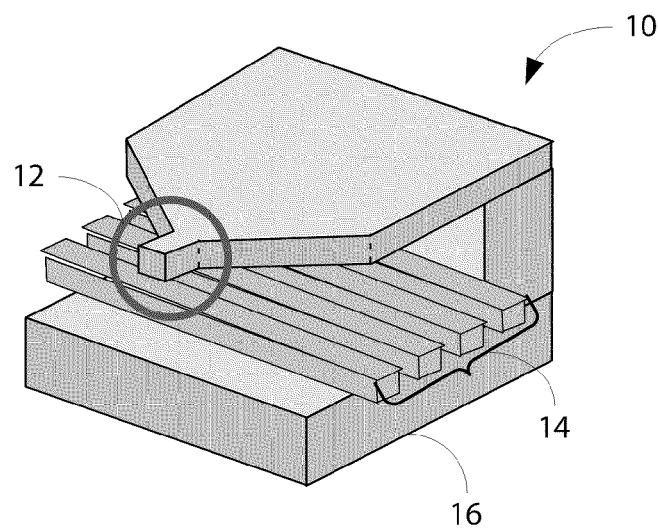
Figure 2:
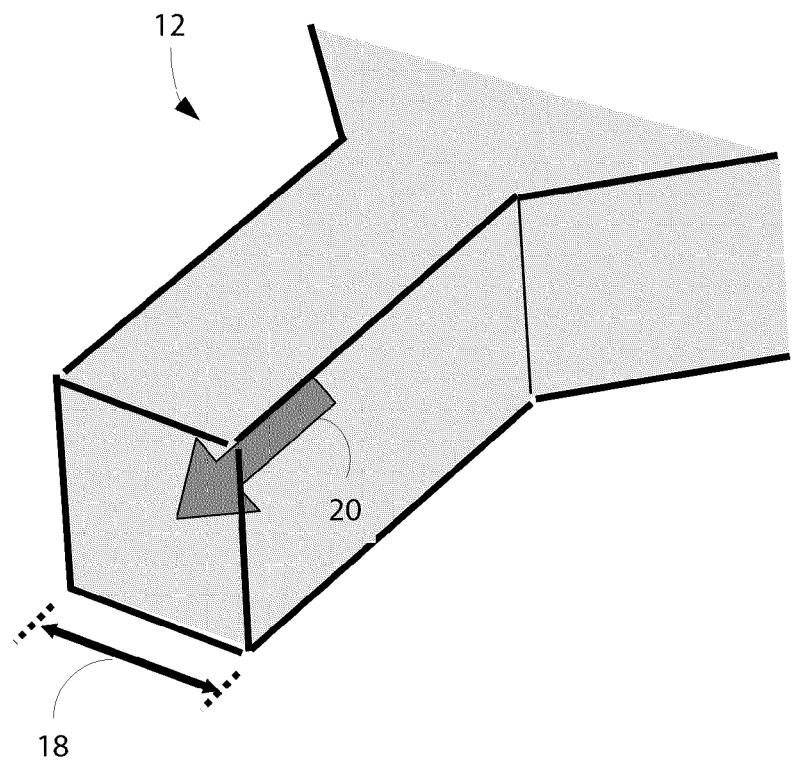
FIG. 2 shows an example of a prior art narrow main pole at 18.
Figure 3:
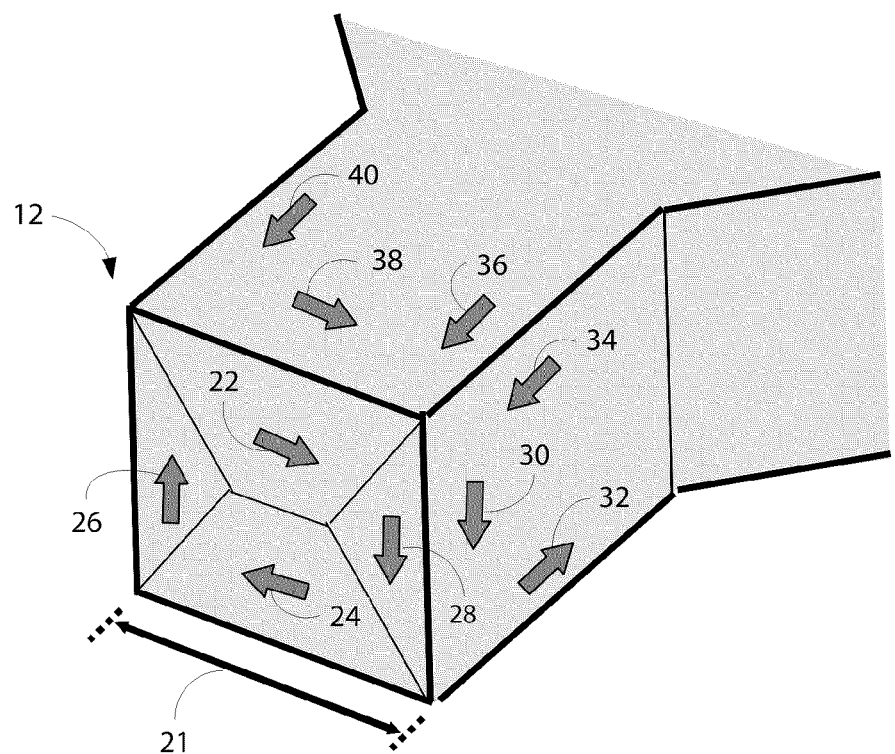
FIG. 3 illustrates an example of a prior art wide main pole.
Figure 4:
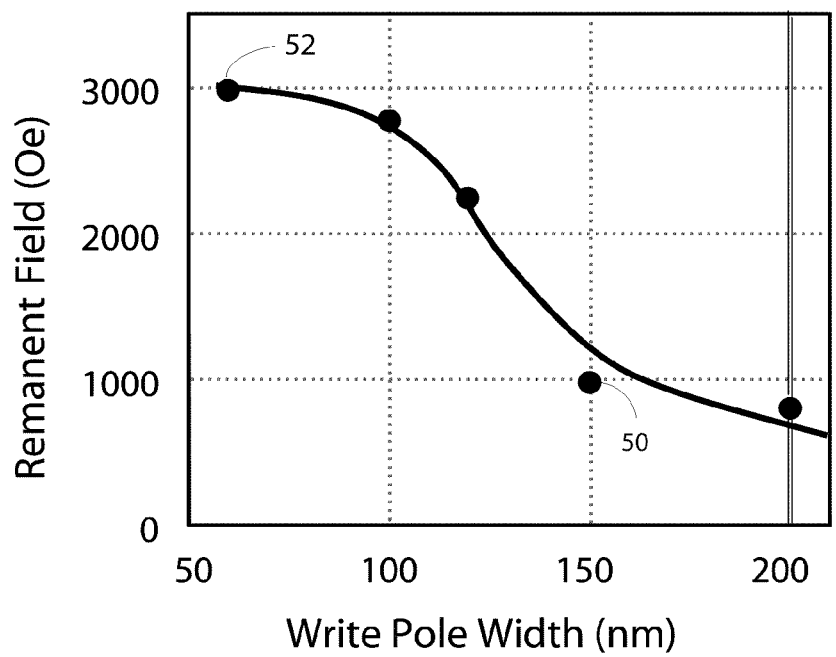
FIG. 4 shows a graph of the effects of a narrower main pole width on remnant field.
Figure 5:
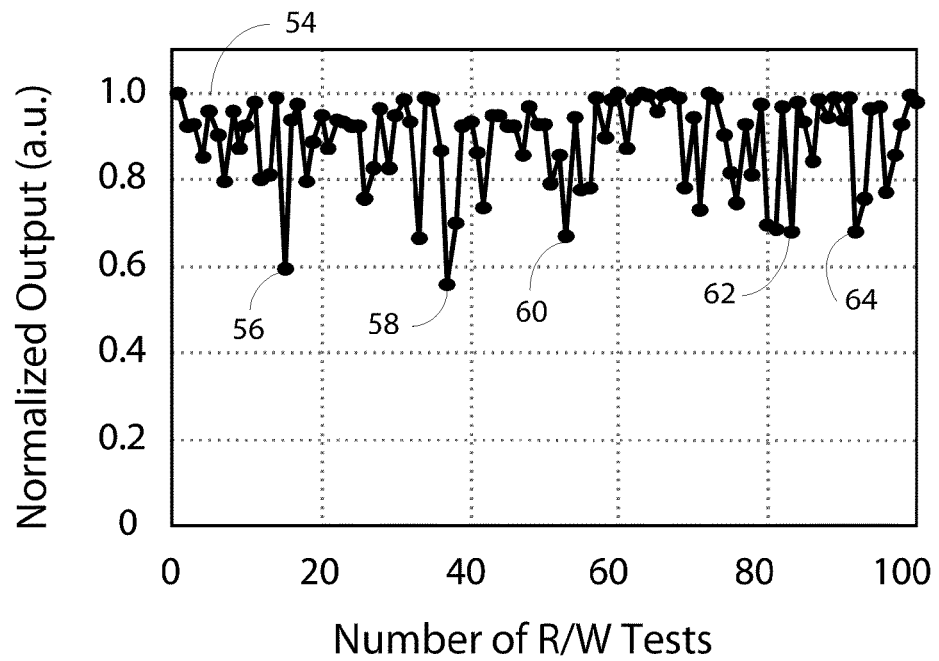
FIG. 5 shows, in graphical form, the undesirable effects of the residual effect and thus, instability of the main pole or write performance.
Figure 6:
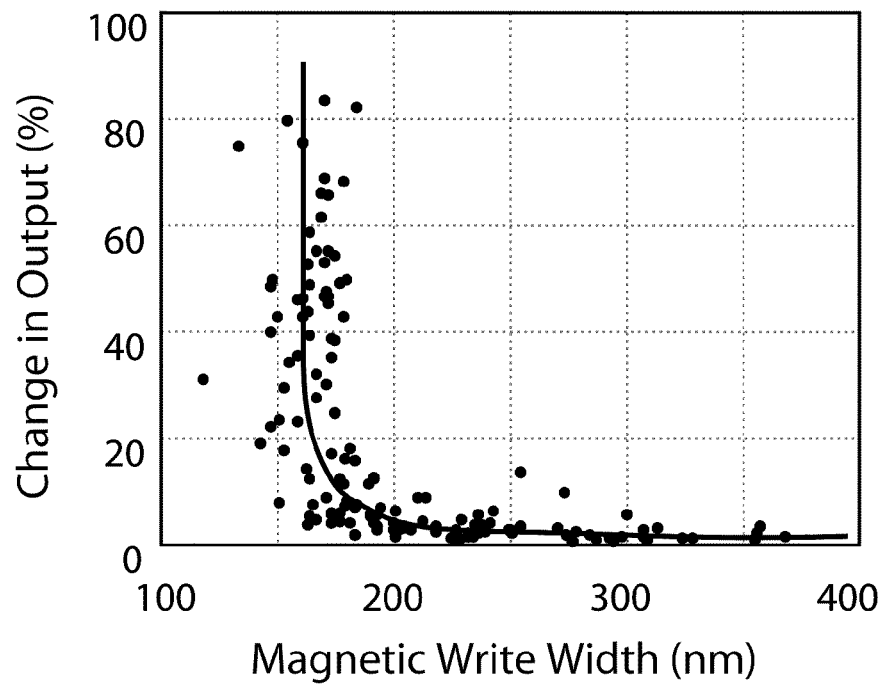
FIG. 6 shows yet another graph of the effects of write instability as a function of the main pole width.
Figure 7:
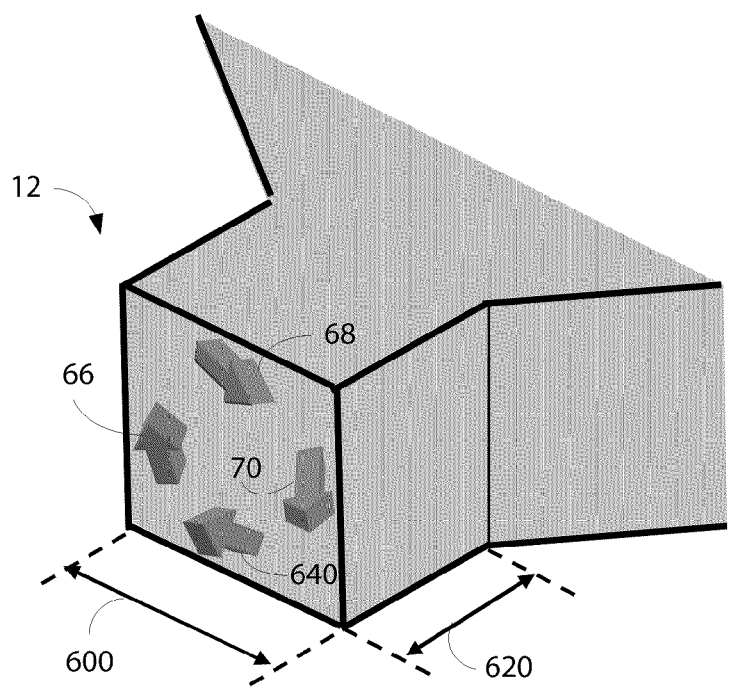
FIGS. 7 and 8 show existing designs of main poles.
Figure 8:
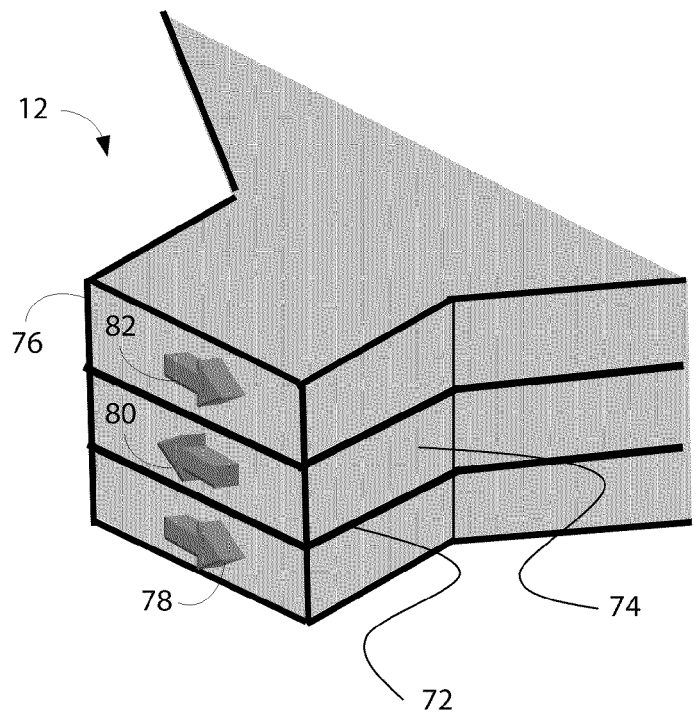
Figure 9:
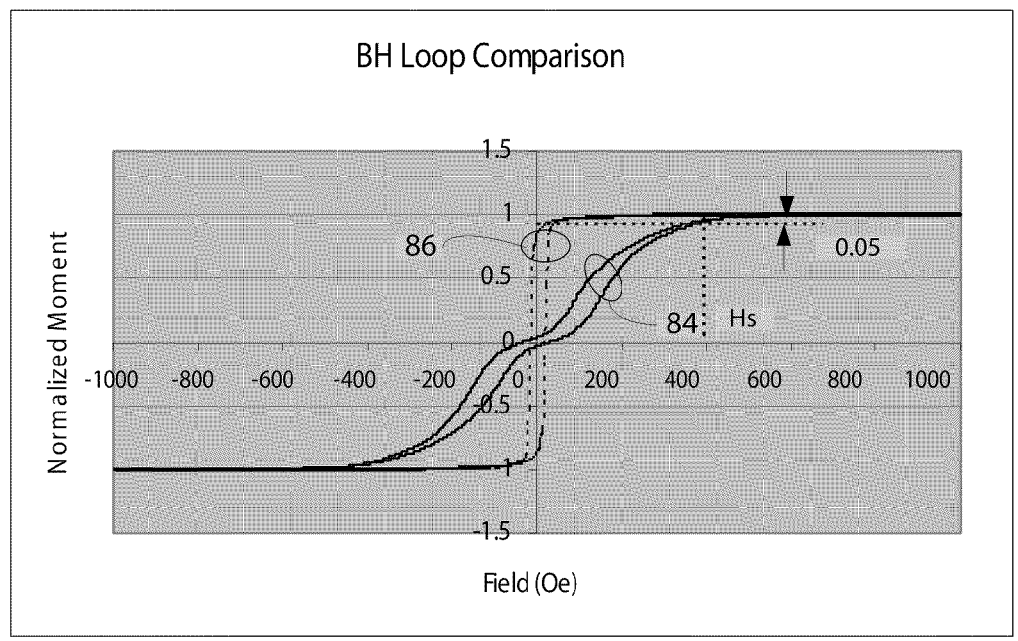
FIG. 9 shows a graph of the remnant field vs. normalized moment for the two types of main poles of FIGS. 7 and 8.
Figure 11:
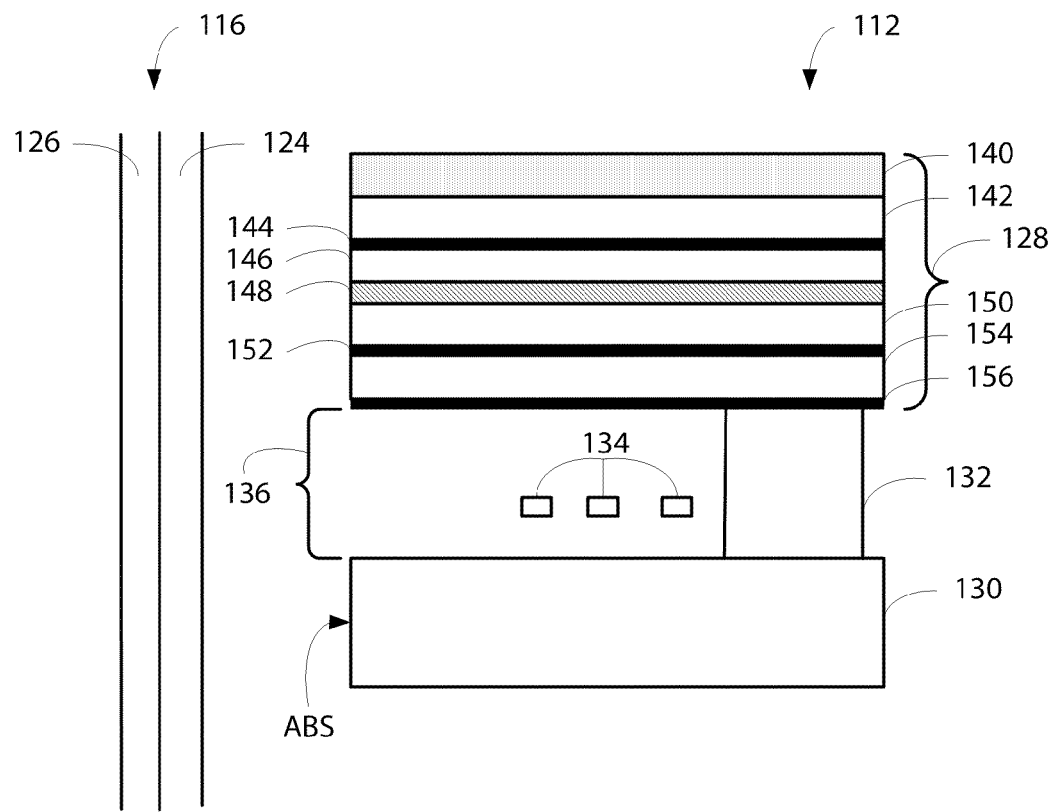
FIG. 11 shows a cross-sectional view of an embodiment of the perpendicular write head 112 in accordance with a embodiment of the present invention.

FIG. 11 shows a cross-sectional view of an embodiment of the perpendicular head (or recorder) 112 in accordance with an embodiment of the present invention. The disc (or medium) 116 utilized by perpendicular recorders generally includes a thin storage layer 124 having high coercivity and perpendicular anisotropy (the magnetization is held in a direction substantially normal to the surface of the disc 116) and a soft magnetic underlayer or keeper 126 having high permeability.

The perpendicular recorder 112 comprises a main pole 128, a return pole 130, connected to each other by a back gap closure 132 at a distal end and separated from each other by a gap 136 at the ABS and write coil 134 positioned between the main pole 128 and the return pole 130.

Magnetization transitions on the disc 116 are recorded by the main pole 128. The main pole 128 has submicron width at the ABS to provide recording of ultra-narrow tracks on the disc 116. Furthermore, the proposed structure of the main pole 128 decreases remnant field in the media as well as coil current for saturation field thereby reducing undesirable data erasures, faster write performance and a reduction in mechanical failures due to the lack of need for high current.

To write data to the perpendicular magnetic disc (or medium) 116, a time-varying write current is caused to flow through the coil 134, which in turn produces a time-varying magnetic field through the main pole 128 and the return pole 130. The disc 116 is then passed by the ABS of the recorder 112 at a predetermined distance such that the disc 116 is exposed to the magnetic field.

A closed magnetic path for flux from the recorder 112 to the disc 116 travels from the main pole 128, through the storage layer 124 of the disc 116 to the soft magnetic keeper 126 and returns to the recorder 112 through the return pole 130, again passing through the storage layer 124. To ensure that the magnetic field does not write data on the return path, while not obvious in FIG. 11, the surface area of the return pole 130 at the ABS is generally substantially larger than the surface area of the main pole 128 at the ABS. Thus, the strength of the magnetic field affecting the storage layer 124 under the return pole 130 will not be sufficient to overcome a nucleation field of the storage layer 124. In one embodiment of the present invention, the thickness of the main pole 128 is between about 100 and about 250 nanometers, although, in other embodiments, other thicknesses may be employed without departing from the scope and spirit of the present invention. However, it should be noted that while the main pole 128 is shown to include a number of layers, i.e. layers 140-156, its thickness is no larger than that being currently used.

Additionally, while the layers of the main pole 128 are illustrated as planar layers, it is contemplated that they may follow other contours. Additionally, the illustrations are not rendered to scale, as noted hereinabove.

The main pole 128 has a multilayer structure in accordance with one embodiment of the present invention. The multilayer main pole 128 comprises a cap layer 140, which is a nonmagnetic layer; magnetic layer 142, made of high magnetic moment material (referred to as high magnetic material); thin magnetic layer 144, made of a soft magnetic material with well-defined anisotropy; magnetic layer 146, made of essentially the same material as that of the layer 142; non-magnetic layer 148; magnetic layer 150, made of essentially the same material as that of the layer 142; thin magnetic layer 152, made of essentially the same material as that of the layer 144; magnetic layer 154, made essentially of the same material as that of the layer 142; and an underlayer 156, made of a soft magnetic material with well-defined anisotropy. The non-magnetic layer 148 is sandwiched between the layers 142-146 and the layers 150-154. Similarly, thin magnetic layer 144 is sandwiched between the layer 142 and the layer 146 and thin magnetic layer 152 is sandwiched between layer 150 and layer 154.

This multilayer pole structure allows for low remnant field effects in the media and low coil current to generate saturation field in the media. The details of the layers 140-156 will be discussed relative to FIG. 13 below. For now, layers 144 and 152 are each generally thinner than each of the layers 142, 146, 150 and 154.

Figure 12:
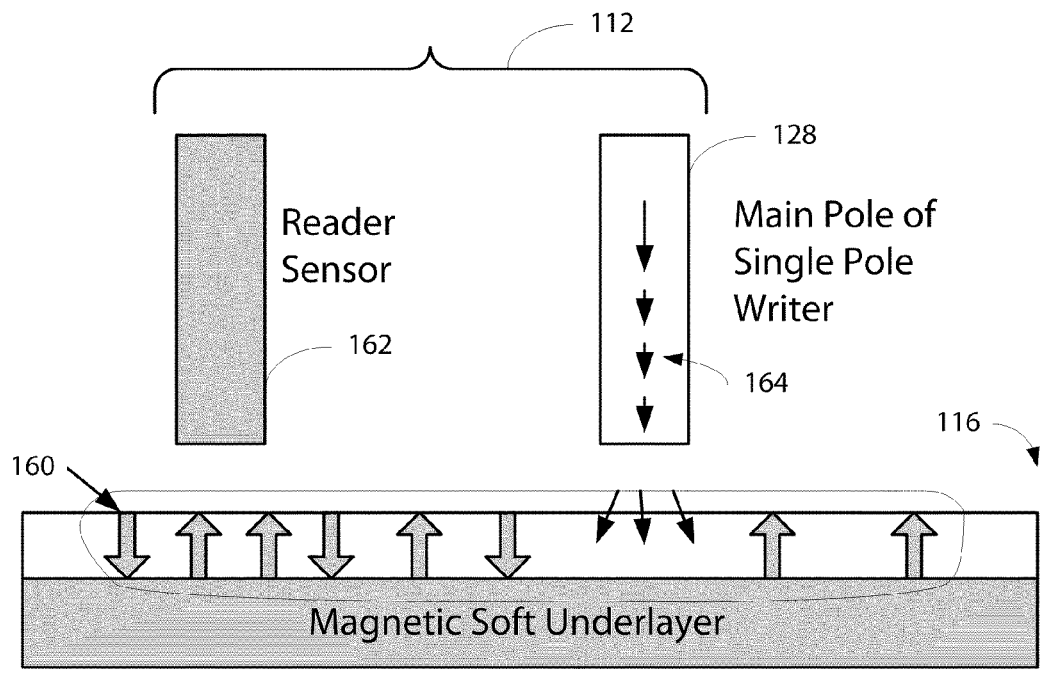
FIG. 12 shows another cross-sectional view of an embodiment of the read-write head (perpendicular) recorder (or head) 112 of the present invention.

FIG. 12 shows another cross-sectional view of an embodiment of the perpendicular recorder (or head) 112 of the present invention. In FIG. 12, the perpendicular head 112 is shown to include a reader sensor 162 for reading recorded or stored magnetically-encoded bits 160 from the disc (or perpendicular magnetic recording medium) 116 and the main pole 128 of a single pole write head for recording or writing the magnetically-encoded bits 116 onto the disc 116. Moments 164 are shown to all be oriented toward the disc 116, in effect, due to the stability of the main pole 164 resulting from the combination of ferromagnetic and AFC effects, as will be apparent shortly.

Figure 13:
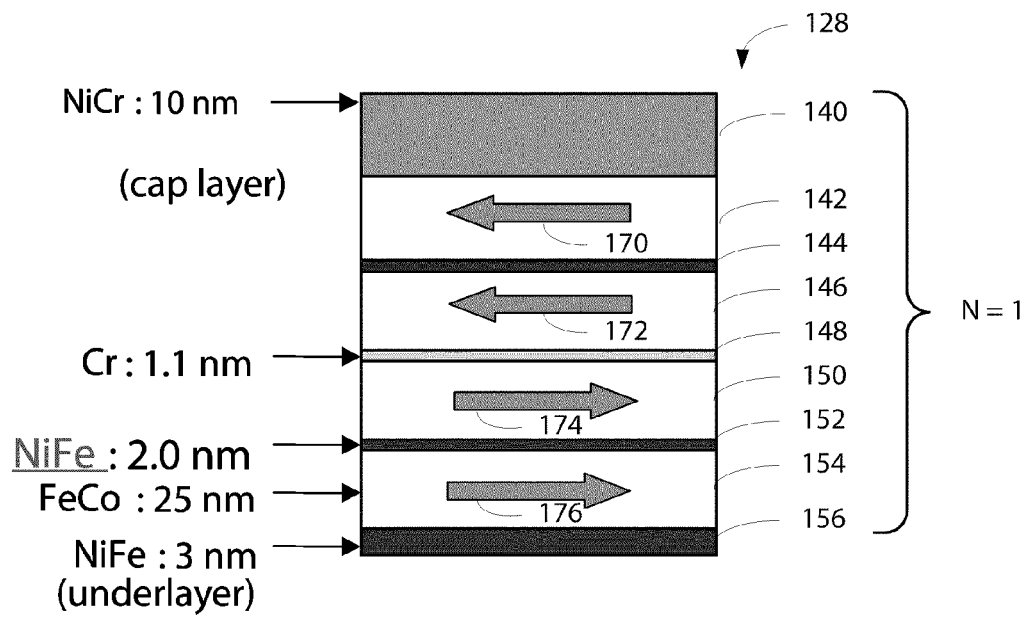
FIG. 13 shows the structure of the main pole 128.

Referring now to FIG. 13, the multilayers of the main pole 128 are shown, as depicted in FIG. 11. It should again be noted that the relative sizes or thicknesses shown in FIG. 13 are not necessarily drawn to scale. Furthermore, while the layers are shown to be planar, other contours are conceivable.

The main pole 128 is depicted to have a unit size of N being one where N is an integer and a unit size of N=1 representing a level-2 stack (or unit) including the layers 140-156 of FIG. 13. The layers 142-146 represent level-1 stack (or unit) and are separated by the separation layer 148 from the layers 150-156, which form another level-1 unit (or stack).

In FIG. 13, the layer 144 separates the high magnetic material into two layers, 142 and 146, as does the layer 152 with respect to the high magnetic layers 150 and 154. The use of the non-magnetic layer 148 between the two high magnetic layers 150 and 146 results in formation of an antiferromagnetic exchange coupling between the layers 146, 142 and the layers 154, 150. The soft magnetic layer 144 between 142 and 146 creates a ferromagnetic (or magnetic) coupling effect between the two layers. This combination of AFC and ferromagnetic effect results in lowering of the field needed to reach saturation or high permeability, i.e. the direction of the moment can be easily changed. Also, the lamination of the layers 152 and 144, as described above, causes the presence of more moments. For example, in FIG. 13, moments 170 and 172 are caused by the lamination of the layer 144 and the moments 174 and 176, which are of an opposite orientation than the moments 170 and 172, are caused by the lamination of the layer 152.

Thus, in FIG. 13, the layer 142 is adjacently below or adjacent to the layer 140 and the layer 144 is adjacently below or adjacent to the layer 142 and the layer 146 is adjacently below or adjacent to the layer 144 and the layer 148 is adjacently below or adjacent to the layer 146 and the layer 150 is adjacently below or adjacent to the layer 148 and the layer 152 is adjacently below or adjacent to the layer 150 and the layer 154 is adjacently below or adjacent to the layer 152 and the layer 156 is adjacently below or adjacent to the layer 154.

Any suitable soft magnetic material with lower coercivity than the coercivity of the layers 142, 146, 150 and 154, may be used for the layers 144 and 152. An example of easy axis coercivity is less than about 15 Oersted. In one embodiment of the present invention, the layers 144 and 152 are each made of NiFe, CoNiFe, FeCoN, CoNiFeN, FeAlN, FeTaN, FeN, NiFeCr, NiFeN, CoZr, CoZrNb, FeAlSi, or another suitable material. Saturation moment for these soft magnetic layers is generally as large as possible so that the main pole does not lose much total moment. It should be noted that while the material of the layers 144 and 152, each have lower magnetic moment relative to that of the layers 142, 146, 150 and 154, the material of the layers 144 and 152 may still be what is considered a high magnetic moment material in absolute terms. The layers 144 and 152 can each be of any suitable thickness but in an example embodiment, each of their thickness is about 2.0 nanometers and certainly less than the thickness of each of the layers 142, 146, 150 and 154.

The layer 148 may be composed of any nonmagnetic material which generates AFC between the magnetic material on each side of this non-magnetic material. In one embodiment of the present invention where FeCo is used for the layers 142, 146, 150 and 154 and a nickel-iron alloy (NiFe alloy) is used for the layers 144 and 152, chromium (Cr) is used for the layer 148. The layer 148 can be of any suitable thickness and in an example embodiment is 1.1 nanometers.

Any suitable material with a high magnetic moment (or hard material) may be used for the layers 142, 146, 150 and 154. In an example embodiment, FeCo alloy with Co content in the range of about 30 to about 50 percent is used therefor. These layers can each be of any suitable thickness, however, it is preferable that each of their thicknesses is larger than each of the thicknesses of the layers 144 and 152. In an example embodiment where the thicknesses of the layers 144 and 152 are each 2.0 nanometers, the thickness of each of the layers 142, 146, 150 and 154 is about and between 10-70 nanometers.

The characteristics of the layer 156 is generally similar to that of the layers 144 and 152, for example, NiFe can be used for the underlayer 156, however, its thickness is generally larger than that of the layers 144 and 152. Non-magnetic seed layer can also be used for layer 156. In one example where the thicknesses of the layers 144 and 152 are each 2.0 nanometers, the thickness of the layer 156 is 3 nanometers.

The cap layer 140 is generally made of any suitable material that is nonmagnetic although magnetic materials with corrosion resistance can also be used. In an example embodiment, the layer 140 is made of NiCr although it can be made of other suitable material including those listed, hereinabove, as examples of material that may be used for the layer 148. The layer 140 can be of any suitable thickness. In an example embodiment where the thicknesses of the layers 144 and 152 are each 2.0 nanometers, the thickness of the layer 140 is 10 nanometers.

The width of the main pole 128 at ABS can be a value appropriate for a given data track density. Various main pole thicknesses may be employed without departing from the scope and spirit of the present invention. The present invention is known to lower the saturation field (Hs) by 50% thereby increasing permeability by 100%.

The thickness of each high moment layer in the laminated film should be determined by the desired permeability and remnant moment. When the thickness of layers 154, 150, 142 and 146 is lower, slightly lower ramanent moment can be obtained while permeability is also low (high field or coil current required to saturate the pole) and total saturated moment is also lower. When the thickness of layers 154, 150, 142 and 146 is higher, permeability and total saturated moment are higher. If the thickness of layers 154, 150, 142 and 146 is too high, remnant moment may also increase.

The benefit of using soft magnetic layer for lamination can be recognized as follows. The thickness of each of the layers 142, 146, 150 and 154 can, in part, determine the saturation field. Generally, the larger the thickness of these layers without the soft magnetic layer lamination, the lower the saturation field (Hs), which is desirable, as previously stated, however, this larger thickness also results in a weaker AFC effect (and higher remnant field) but with the use of the laminations of the layers 144 and 152, the ferromagnetic effect is coupled with AFC effect to produce desirable results, i.e. low remnant moment and low saturation field, Hs (high permeability). In the present invention, the ferromagnetic coupling extends the maximum FeCo thickness for AFC—desired for lower Hs and higher total moment. This can be perhaps better observed with reference to the graph of FIG. 15.

Figure 13A:
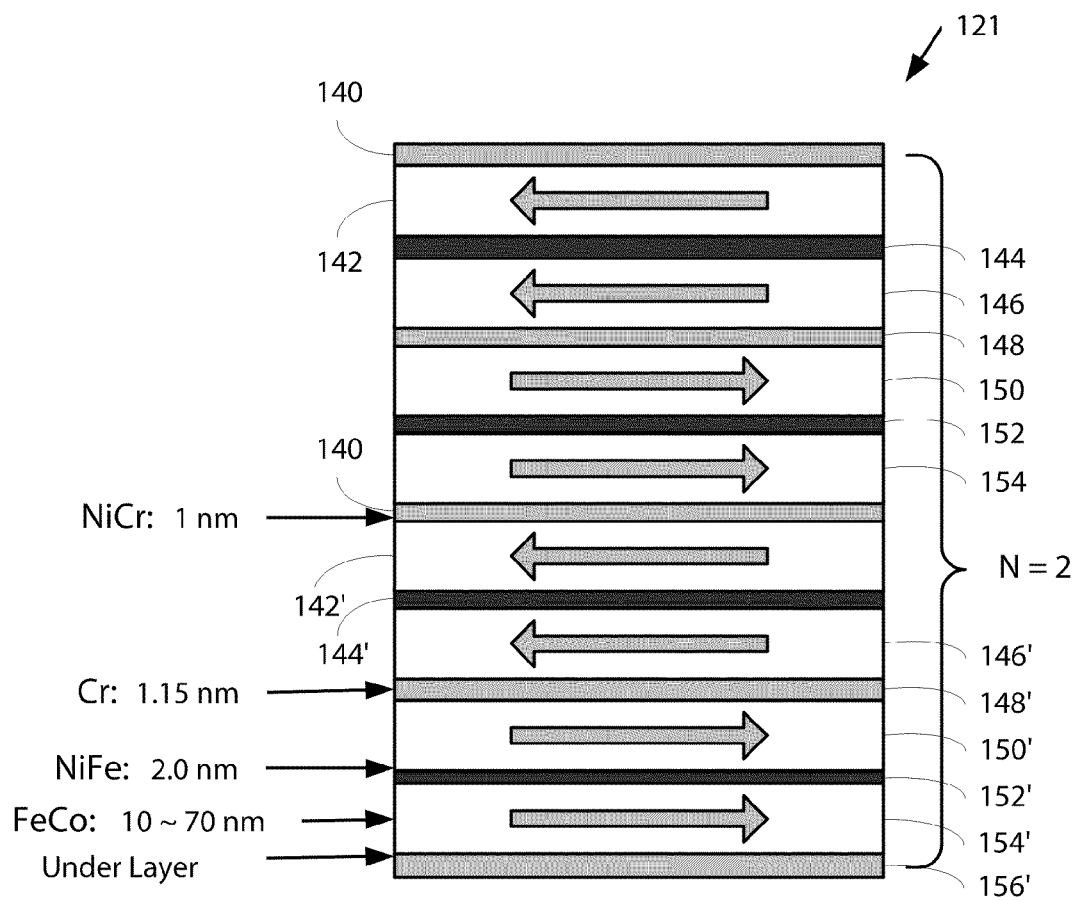
FIG. 13(a) shows another example structure of the main pole 121 in accordance with another embodiment of the present invention.
Figure 14:
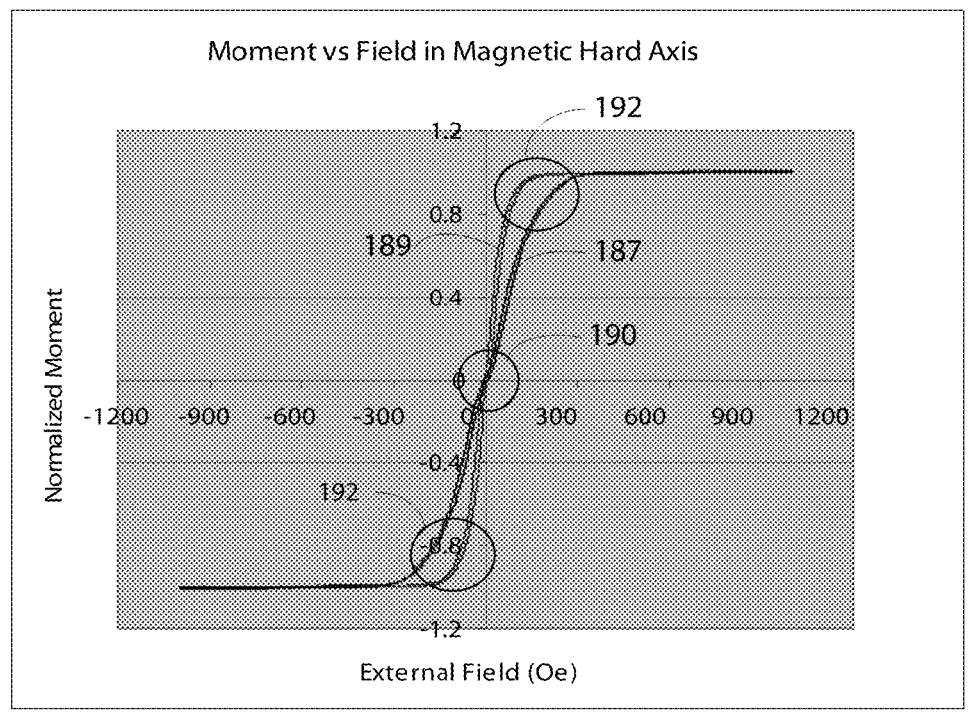
FIG. 14 shows a graph of the performance of the embodiment of FIG. 13(a) relative to the external field (shown on the horizontal axis of the graph) vs. the moment (shown on the vertical axis of the graph) compared to prior art, an eight-layer CoFe lamination using the scheme of FIG. 8).

FIG. 14 shows a graph of the performance of the embodiment of FIG. 13(a) relative to the external field (shown on the horizontal axis of the graph) vs. the moment (shown on the vertical axis of the graph) and that of prior art. The curve 189 represents the performance of one of the embodiments of the present invention, such as that shown in FIG. 13(a), total film thickness is 236 nm and FeCo thickness in each layer is 27.4 nm, whereas the curve 187 represents the performance of prior art with the same total thickness and the same individual CoFe thickness. The remnant moment of the former is 3.65% while that of the prior art is 2.65% and the Hs at 95% saturation of the former is 132 while that of prior art is 262.

It has been the inventors' experience that permeability is increased by approximately 100% over that of current main pole technology. In FIG. 14, at 190, the remnant field is shown to be close to zero or at very low values and at 192, saturation coil current is low or the rate at which writing is performed is increased in comparison to the performance of current multiplayer main pole designs.

FIG. 13(a) shows another example structure of the main pole 121 in accordance with another embodiment of the present invention. The main pole 121 of FIG. 13(a) is essentially similar to that of the main pole 128 of FIG. 13 except that the main pole 121 includes layers of thicknesses that are slightly different than that shown for the main pole 128 and the main pole 121 shows stacking of essentially two of the layers 140-154 with each stack of layers separated from each other by the layer 140. The stack of layers that is adjacent to the layers 140-156 is shown as layers 142'-156', thus, creating an N=2 structure. It should be noted that while not shown, any number of stacks may be used adjacent to each other, as shown in FIG. 13(a), and with N being an integer number.

Figure 13B:
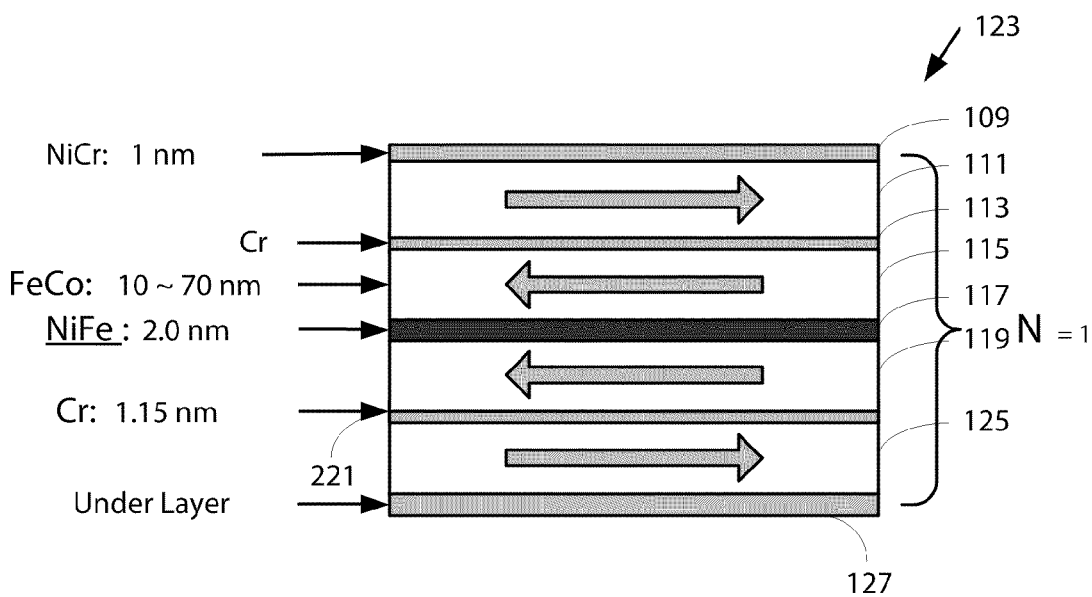
FIG. 13(b) shows another example embodiment with a main pole 123.

FIG. 13(b) shows another example embodiment with a main pole 123. In FIG. 13(b), the layer 111 is adjacently below or adjacent to the layer 109 and the layer 113 is adjacently below or adjacent to the layer 111 and the layer 115 is adjacently below or adjacent to the layer 113 and the layer 117 is adjacently below or adjacent to the layer 115 and the layer 119 is adjacently below or adjacent to the layer 117 and the layer 221 is adjacently below or adjacent to the layer 119 and the layer 125 is adjacently below or adjacent to the layer 221 and the layer 127 is adjacently below or adjacent to the layer 125.

The use of the non-magnetic layer 113 between the two high magnetic layers 111 and 115 and the layer 221 between the two high magnetic layers 119 and 125 and the layer 117 between the two high magnetic layers 115 and 119 results in formation of an antiferromagnetic exchange coupling between the layers 119, 125 and the layers 111, 115 and magnetic coupling between the layers 115 and 119. The separation of one domain into two domains, such as 111 and 115 creates a ferromagnetic coupling effect between the two layers. This combination of AFC and ferromagnetic effect results in lowering of the field needed to reach saturation or high permeability, i.e. the direction of the moment can be easily changed. Also, the lamination of the layer 117, as described above, causes the presence of more moments.

The layers 111, 115, 119 and 125 are high magnet layers, such as FeCo, and as those described earlier. The layer 109 is a cap layer, such as the layer 140 of FIG. 13 and in one embodiment, this layer is made of NiCr. The layers 113 and 221 may be composed of any nonmagnetic material which generates AFC between the magnetic material on each side of this non-magnetic material. In one embodiment of the present invention where FeCo is used for the layers 111, 115, 119 and 125 and a nickel-iron alloy (NiFe alloy) is used for the layer 117, Cr is used for the layers 113 and 221. The layer 148 can be of any suitable thickness and in an example embodiment is 1.1 nanometers.

Any suitable material with a soft magnetic moment, lower than the magnetic moment of the layers 111, 115, 119 and 125, may be used for the layer 117. This material is also preferably magnetically soft, with an example easy axis coercivity of less than about 15 Oersted. In one embodiment of the present invention, the layer 117 is made of NiFe, CoNiFe, FeCoN, CoNiFeN, FeAlN, FeTaN, FeN, NiFeCr, NiFeN, CoZr, CoZrNb, FeAlSi, or another suitable material. Saturation moment for these soft magnetic layers is generally as large as possible so that the main pole does not lose much total moment. It should be noted that while the material of the layer 117, has lower magnetic moment relative to that of the layers 111, 115, 119 and 125, the material of the layer 117 may still be what is considered a high magnetic moment material in absolute terms. The layer 117 is of any suitable thickness but in an example embodiment, each of their thickness is about 2.0 nanometers and certainly less than the thickness of each of the layers 111, 115, 119 and 125.

The layers 113 and 221 can each be of any suitable thickness and in an example embodiment are each 1.15 nanometers (nm).

Any suitable material with a high magnetic moment may be used for the layers 111, 115, 119 and 125. In an example embodiment, FeCo alloy with Co content in the range of about 30 to about 50 percent is used therefor. These layers can each be of any suitable thickness, however, it is preferable that each of their thicknesses is larger than each of the thickness of the layer 117. In an example embodiment where the thicknesses of the layer 117 is 2.0 nanometers, the thickness of each of the layers 111, 115, 119 and 125 is about and between 10-70 nanometers.

The characteristics of the layer 127 is generally similar to that of the layer 117, for example, NiFe can be used for the underlayer 127, however, its thickness is generally larger than that of the layer 117. Non-magnetic seed layer can also be used for layer 127.

The cap layer 109 is generally made of any suitable material that is nonmagnetic although magnetic materials with corrosion resistance can also be used. In an example embodiment, the layer 109 is made of NiCr although it can be made of other suitable material including those listed, hereinabove, as examples of material that may be used for the layer 113. The layer 109 can be of any suitable thickness, however, it is generally, thicker than that of each of the layer 117. In an example embodiment where the thicknesses of the layer 117 is 2.0 nanometers, the thickness of the layer 109 is 1 nanometer.

In FIG. 14, the graph includes two curves showing performances, one curve 189 shows performance an example embodiment while the curve 187 shows the performance of prior art. Both cases have the same total film thickness of 236 nm and the same FeCo thickness of 27.5 nm in each layer. This figure shows that the saturation field of this invention is about 50% that of the prior art 84, AFC Lam CoFe.

It has been experienced that the present invention exhibits lower film stress levels than known multilayer main pole structures. For example, one embodiment of the present invention exhibits a film stress of approximately 8.8 MePa whereas existing main pole designs exhibit approximately −624 MePa stress levels. Furthermore, the saturation moment (Ms) of an embodiment of the present invention is approximately 113 Memu as compared with approximately 108 Memu of that of existing designs for the same total thickness of main pole.

Figure 15:
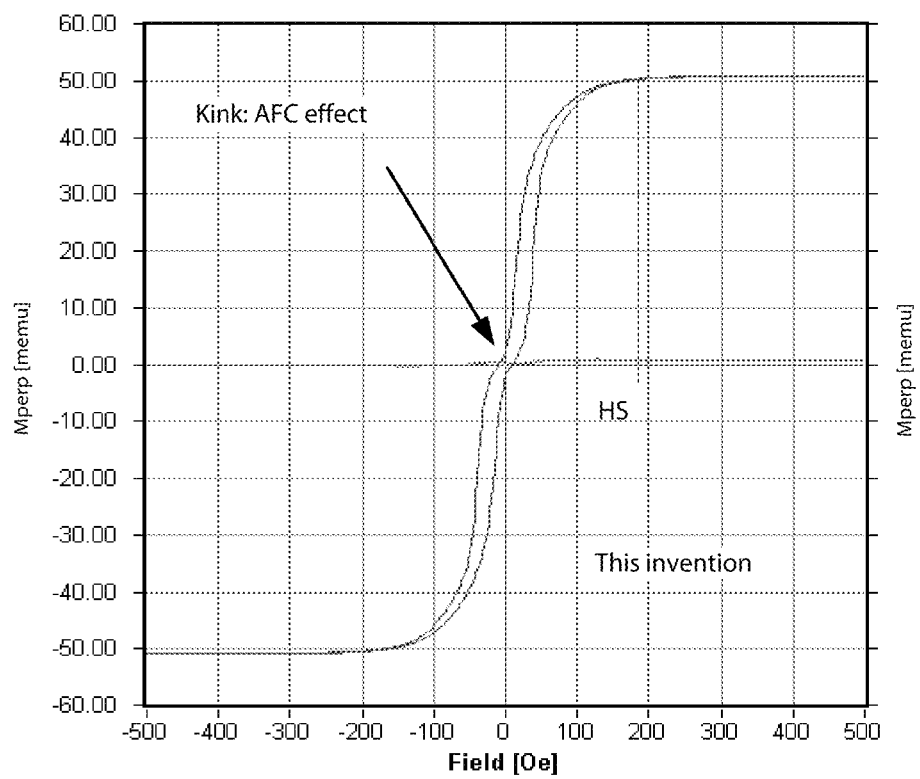
FIG. 15 shows another graph of the performance of the embodiment of FIG. 13 relative to external field (shown on the horizontal axis of the graph) vs. the moment (shown on the vertical axis of the graph).

FIG. 15 shows another graph of the performance of the embodiment of FIG. 13 relative to external field (shown on the horizontal axis of the graph) vs. the moment (shown on the vertical axis of the graph) indicating the lamination with soft magnetic layer can enhance effect of AFC. The total film thickness is about 108 nm. There is one Cr AFC laminating layer and each 50 nm is laminated with a 2 nm NiFe layer in the middle of 50 nm FeCo. The net AFC effect is enhanced by the lamination with a NiFe soft magnetic layer. The overall AFC effect is enhanced and much lower remnant magnetization is realized by lamination of each of the 50 nm CoFe layers with a 2 nm NiFe.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

The invention claimed is:

1. A perpendicular write head employed to write data to a perpendicular magnetic disc, the perpendicular write head comprising:
    a main pole having a surface area and comprising high moment magnetic layers laminated with both soft magnetic layers and non-magnetic layers to cause a combination of antiferromagnetic coupling (AFC) and ferromagnetic coupling (FC) of stacks of layers, a non-magnetic separation layer, separating two of the stacks and each of the two stacks including,
        a first layer being high magnetic moment material;
        a second layer adjacently below the first layer and being a soft magnetic layer, the second layer being composed of a material selected from a group consisting of: FeCoN, FeAlN, FeTaN, FeN, CoZr, CoZrNb and FeAlSi;
        a third layer adjacently below the second layer having high magnetic moment material,
    the non-magnetic separation layer causing AFC between the high magnetic moment layers of the stacks, and the second layer of each stack causing FC between the first and third layers of each stack; and
    a return pole connected to the main pole by a back gap closure at a distal end and separated from the main pole by a gap at an air bearing surface (ABS), a write coil positioned between the main pole and the return pole, wherein the surface area of the return pole at the ABS is substantially larger than the surface area of the main pole at the ABS,
    further wherein upon writing data to the perpendicular magnetic disc, a time-varying write current is caused to flow through the write coil, which in turn produces a time-varying magnetic field through the main pole and the return pole, the disc is then passed by the ABS at a predetermined distance such that the perpendicular magnetic disc is exposed to magnetic field, a closed magnetic path for flux from the perpendicular write head to the perpendicular magnetic disc travels from the main pole, through the perpendicular magnetic disc and returns to the perpendicular write head through the return pole.

2. A perpendicular write head as recited in claim 1 wherein each of the layers of each of the stacks has an associated thickness and wherein the thickness of the second layer of each of the stacks is less than the thickness of each of the corresponding first and third layers of the corresponding stack.

3. A perpendicular write head as recited in claim 1 further comprising a cap layer being of a nonmagnetic material and adjacently above the first layer of the top most stack of the stacks.

4. A perpendicular write head as recited in claim 1 further comprising an underlayer adjacently below the third layer of the bottom most stack of the stacks.

5. A perpendicular write head as recited in claim 4 wherein the underlayer is composed of a magnetic material.

6. A perpendicular write head as recited in claim 4 wherein the underlayer is composed of a soft magnetic material.

7. A perpendicular write head as recited in claim 1 wherein said first and third layers are composed of an alloy comprising iron and cobalt.

8. A perpendicular write head as recited in claim 1 wherein the thickness of the non-magnetic separation layer is approximately 1.1 nanometers.

9. A perpendicular write head employed to write data to a perpendicular magnetic disc, the perpendicular write head comprising:
    a main pole including:
        a first cobalt-iron alloy layer having a first magnetic moment;
        a first soft magnetic layer having a second magnetic moment;
        a second cobalt-iron alloy layer having a third magnetic moment, said first soft magnetic layer being formed in between the first and second cobalt-iron alloy layers, the second magnetic moment being lower than the first and the third magnetic moments, the first cobalt-iron alloy layer being ferromagnetically coupled with the second cobalt-iron alloy layer;

a nonmagnetic layer adjacently below the second cobalt-iron alloy layer;

a third cobalt-iron alloy layer adjacently below the nonmagnetic layer and having a fourth magnetic moment;

a second soft magnetic layer having a fifth magnetic moment; and a fourth cobalt-iron alloy layer having a sixth magnetic moment, said second soft magnetic layer being in between the third cobalt-iron alloy layer and the fourth cobalt-iron alloy layer, the fifth magnetic moment being lower than the fourth and the sixth magnetic moments, the third cobalt-iron alloy layer being ferromagnetically coupled with the fourth cobalt-iron alloy layer and the third and fourth cobalt-iron alloy layers being antiferromagnetically coupled with the first and second cobalt-iron alloy layers;

a return pole connected to the main pole by a back gap closure at a distal end and separated from the main pole by a gap at an air bearing surface (ABS), a write coil positioned between the main pole and the return pole, wherein the surface area of the return pole at the ABS is substantially larger than the surface area of the main pole at the ABS, further wherein upon writing data to the perpendicular magnetic disc, a time-varying write current is caused to flow through the write coil, which in turn produces a time-varying magnetic field through the main pole and the return pole, the disc is then passed by the ABS at a predetermined distance such that the perpendicular magnetic disc is exposed to magnetic field, a closed magnetic path for flux from the perpendicular write head to the perpendicular magnetic disc travels from the main pole, through the perpendicular magnetic disc and returns to the perpendicular write head through the return pole.

10. A perpendicular write head as recited in claim 9 wherein each of the first cobalt-iron alloy layer, the first soft magnetic layer, the second cobalt-iron alloy layer, the third cobalt-iron alloy layer, the second soft magnetic layer and the fourth cobalt-iron alloy layer have an associated thickness and wherein the thickness of the first soft magnetic layer is less than the thickness of each of the first and second cobalt-iron alloy layers and the thickness of the second soft magnetic layer is less than the thickness of each of the third and fourth cobalt-iron alloy layers.

11. A perpendicular write head as recited in claim 10 wherein the nonmagnetic layer has a thickness that is approximately 1.1 nanometers.

12. A perpendicular write head as recited in claim 9 further comprising a cap layer being of a nonmagnetic material and adjacently above the first cobalt-iron alloy layer.

13. A perpendicular write head as recited in claim 9 further comprising an underlayer adjacently below the fourth cobalt-iron alloy layer.

14. A perpendicular write head as recited in claim 13 wherein the underlayer is composed of a magnetic material.

15. A perpendicular write head as recited in claim 13 wherein the underlayer is composed of a soft magnetic material.

16. A perpendicular write head employed to write data to a perpendicular magnetic disc, the perpendicular write head comprising:

a main pole including:

a first magnetic layer having a first magnetic moment;

a second magnetic layer having a second magnetic moment, and being composed of a material selected from a group consisting of: FeCoN, FeAlN, FeTaN, FeN, CoZr, CoZrNb and FeAlSi;

a third magnetic layer, said second magnetic layer being in between the first and third magnetic layers and having a third magnetic moment, the second magnetic moment being lower than the first and the third magnetic moments, the first magnetic layer being ferromagnetically coupled with the third magnetic layer;

a non magnetic layer adjacently below the third magnetic layer;

a fourth magnetic layer adjacently below the nonmagnetic layer and having a fourth magnetic moment;

a fifth magnetic layer having a fifth magnetic moment, and being composed of a material selected from a group consisting of: FeCoN, FeAlN, FeTaN, FeN, CoZr, CoZrNb and FeAlSi;

a sixth magnetic layer having a sixth magnetic moment, said fifth magnetic layer being in between the fourth magnetic layer and the sixth magnetic layer, the fifth magnetic moment being lower than the fourth and the sixth magnetic moments, the fourth magnetic layer being ferromagnetically coupled with the sixth magnetic layer and the fourth and sixth magnetic layers being antiferromagnetically coupled with the first and third magnetic layers; and a return pole connected to the main pole by a back gap closure at a distal end and separated from the main pole by a gap at an air bearing surface (ABS), a write coil positioned between the main pole and the return pole, wherein the surface area of the return pole at the ABS is substantially larger than the surface area of the main pole at the ABS, further wherein upon writing data to the perpendicular magnetic disc, a time-varying write current is caused to flow through the write coil, which in turn produces a time-varying magnetic field through the main pole and the return pole, the disc is then passed by the ABS at a predetermined distance such that the perpendicular magnetic disc is exposed to magnetic field, a closed magnetic path for flux from the perpendicular write head to the perpendicular magnetic disc travels from the main pole, through the perpendicular magnetic disc and returns to the perpendicular write head through the return pole.

17. A perpendicular write head as recited in claim 16 further comprising a cap layer being of a nonmagnetic material and adjacently above the first magnetic layer.

18. A perpendicular write head as recited in claim 16 further comprising an underlayer adjacently below the sixth magnetic layer.

19. A perpendicular write head as recited in claim 18 wherein the underlayer is composed of a magnetic material.

20. A perpendicular write head as recited in claim 18 wherein the underlayer is composed of a soft magnetic material.

21. A perpendicular write head as recited in claim 16 wherein said first, third, fourth and sixth magnetic layers are composed of hard magnetic material.

22. A perpendicular write head as recited in claim 16 wherein said second and fifth magnetic layers are composed of soft magnetic material.

23. A perpendicular write head as recited in claim 16 wherein said first, third, fourth and sixth magnetic layers are composed of an alloy comprising iron and cobalt.

* * * * *